United States Patent
Yu (10) Patent No.: US 8,908,137 B2
(45) Date of Patent: Dec. 9, 2014

(54) BACKLIGHT MODULE HAVING POSITIONING HOOK

(75) Inventor: Gang Yu, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/389,553

(22) PCT Filed: Dec. 23, 2011

(86) PCT No.: PCT/CN2011/084534
§ 371 (c)(1),
(2), (4) Date: Feb. 8, 2012

(87) PCT Pub. No.: WO2013/078744
PCT Pub. Date: Jun. 6, 2013

(65) Prior Publication Data
US 2013/0140418 A1 Jun. 6, 2013

(30) Foreign Application Priority Data
Dec. 2, 2011 (CN) .......................... 2011 1 0396002

(51) Int. Cl.
*G02F 1/1343* (2006.01)
(52) U.S. Cl.
USPC ........... 349/141; 349/58; 248/215; 248/316.7

(58) Field of Classification Search
USPC ................... 248/215, 316.7, 231.81, 229.16, 248/229.26, 228.7, 230.7, 231.71, 228.6, 248/230.6, 229.15, 229.25, 316.1
See application file for complete search history.

(56) References Cited

U.S. PATENT DOCUMENTS 3,782,559 A * 1/1974 Wright ............................ 211/17
3,799,416 A * 3/1974 Schmaltz ....................... 294/142
(Continued)

FOREIGN PATENT DOCUMENTS

| CN | 201126509 | 10/2008 |
|----|-----------|---------|
| CN | 10185854 | 10/2010 |

(Continued)

*Primary Examiner* — Nkeisha Smith
(74) *Attorney, Agent, or Firm* — Muncy, Geissler, Olds & Lowe, P.C.

(57) ABSTRACT

A positioning hook of an optical film of a backlight module, wherein the backlight module has a frame, and the optical film is disposed on an inner side of the frame. The positioning hook includes a first hook portion and a second hook portion corresponding with each other. The first hook portion is disposed at a first end of the positioning hook for penetrating through and hooking on an edge of the optical film. The second hook portion is disposed at a second end of the positioning hook opposite to the first end for hooking on an edge of the frame, so that the optical film is disposed and fixed in the frame.

1 Claim, 7 Drawing Sheets

(56) References Cited

U.S. PATENT DOCUMENTS

| | | | | |
|---|---|---|---|---|
| 3,891,176 | A | * | 6/1975 | Downing et al. ............. 248/340 |
| 4,799,637 | A | * | 1/1989 | Fahringer ................. 248/220.43 |
| 5,097,541 | A | * | 3/1992 | Annand ............................ 4/558 |
| 5,478,039 | A | * | 12/1995 | Wright .......................... 248/341 |
| 5,613,656 | A | * | 3/1997 | Protz, Jr. ..................... 248/74.2 |
| 5,771,504 | A | * | 6/1998 | Steiner ............................. 4/558 |
| D456,696 | S | * | 5/2002 | Samelson ..................... D8/367 |
| D458,536 | S | * | 6/2002 | Samelson ..................... D8/367 |
| D464,867 | S | * | 10/2002 | Samelson ..................... D8/367 |
| 7,000,783 | B2 | * | 2/2006 | Webb ............................. 211/20 |
| 7,309,088 | B2 | * | 12/2007 | Fiore et al. ..................... 294/24 |
| D560,473 | S | * | 1/2008 | Wolfe, Jr. ...................... D8/367 |
| 7,938,464 | B1 | * | 5/2011 | Hielm ........................... 294/175 |
| 2009/0033827 | A1 | * | 2/2009 | Chen et al. ..................... 349/58 |

FOREIGN PATENT DOCUMENTS

| | | |
|---|---|---|
| CN | 101876759 | 11/2010 |
| CN | 101956938 | 1/2011 |
| CN | 201852047 | 6/2011 |
| CN | 201965372 | 9/2011 |
| JP | 2010054935 | 3/2010 |

\* cited by examiner

BACKLIGHT MODULE HAVING POSITIONING HOOK

FIELD OF THE INVENTION

The present invention relates to a component structure of a backlight module of a liquid crystal display device and more particularly to a positioning component for an optical film.

BACKGROUND OF THE INVENTION

Conventional techniques for disposing an optical film in a frame of a backlight module are as follows:

A first method: studs are disposed on a back plate, and holes are disposed on the optical film corresponding to the studs, by having the studs going through the holes, the optical film is disposed and fixed on the back plate.

A second method: fitting grooves are formed directly on the back plate when it is manufactured, and the optical film is fitted in the fitting grooves so that it is disposed and fixed on the back plate.

A third method: the backlight module has an upper frame and a lower frame, and they have structures of hooks and grooves respectively with corresponding shapes, a structure is designed in one of the frames for disposing the optical film between the upper and the lower frames. The upper and the lower frames are tightly fitted together by the hooks and the grooves with corresponding shapes, and the optical film is limited to move, so that it is disposed and fixed on the back plate.

However, for the first method, the manufacturing procedures of the backlight module will be increased by the disposing of the studs and the holes, resulting in the production efficiency of the backlight module being affected tremendously. For the second method, burrs are usually generated on edges of the grooves when they are formed, and the optical film may be damaged easily from cutting by the burrs. For the third method of the upper and the lower frames, even though the optical film is effectively fixed, it is not possible for the backlight module to have a slim design, and the space for disposing other components is limited, and resulting in the quality of the backlight module being affected. Therefore it is necessary to improve the component structures of the backlight module, particularly the positioning components for the optical film.

SUMMARY

In order to tackle the abovementioned technical problems, the present invention provides a positioning hook of an optical film of a backlight module, by which the manufacturing procedures of the backlight module can be simplified and the optical film can be positioned effectively.

Technical solutions employed by the present invention to solve the abovementioned technical problems include providing a positioning hook of an optical film of a backlight module, wherein the backlight module has a back plate and the optical film is disposed on the back plate. The positioning hook includes:

a first hook portion disposed at a first end of the positioning hook for penetrating through and hooking on an edge of the optical film; and a second hook portion disposed at a second end of the positioning hook opposite to the first end for hooking on a rim of the back plate, so that the optical film is disposed and fixed on the back plate.

The positioning hook of the present invention further includes:

The first hook portion is an arc-shaped hook, a rectangular hook, a triangular hook or a V-shaped hook.

The second hook portion is an arc-shaped hook or a rectangular hook.

The positioning hook is formed integrally.

The positioning hook is made of iron, aluminum, ferroalloy, aluminum alloy or plastic.

Compared with the conventional techniques, the positioning hook of the optical film of the backlight module of the present invention has at least the advantages and effects of: by having the structure of hooks at two ends, the optical film can be positioned on the back plate effectively, the manufacturing and assembling procedures of the backlight module can be simplified, and the optical film can be intact. Moreover, by having the design of small hooks, the backlight module and an entire liquid crystal panel can be made slimly.

DETAILED DESCRIPTION OF THE INVENTION

Structures, characteristics, effects and technical means of embodiments of a positioning hook of an optical film of a backlight module of the present invention will become more fully understood by reference to the following detailed description thereof when read in conjunction with the attached drawings.

Figure 1:
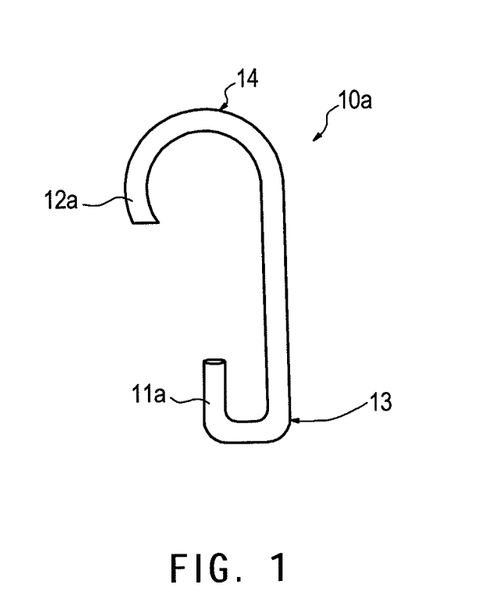
FIG. 1 is an illustration of a first structure of a positioning hook of an optical film of a backlight module of the present invention.

Referring to FIG. 1, it shows a first structure of a positioning hook of an optical film of a backlight module of the present invention. A positioning hook 10a has a first hook portion 11a and a second hook portion 12a, the first hook portion 11a is disposed at a first end 13 of the positioning hook 10a, and the second hook portion 12a is disposed at a second end 14 of the positioning hook 10a. In this embodiment, the first hook portion 11a is roughly a rectangular hook and the second hook portion 12a is an arc shaped hook.

Figure 2A:
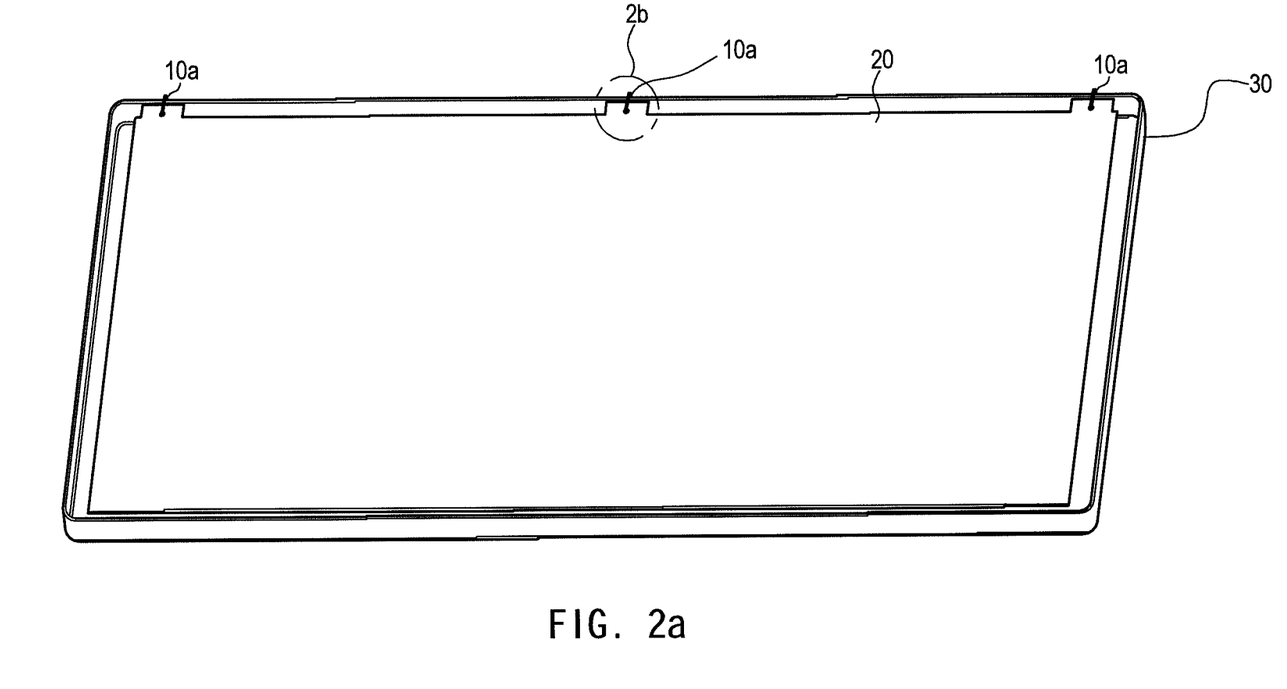
FIG. 2a is a structural illustration of the optical film being positioned on a back plate by the positioning hook of the present invention.
Figure 2B:
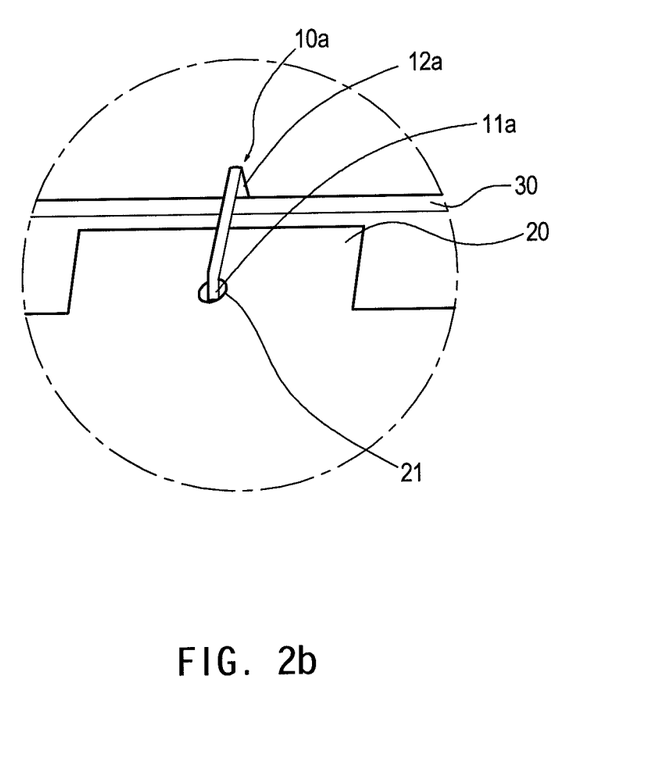
FIG. 2b is an enlarged view of a portion 2b of FIG. 2a of the present invention.

Referring to FIGS. 2a and 2b, FIG. 2a shows the optical film being positioned on a back plate by the positioning hook of the present invention, and FIG. 2b is an enlarged view of a portion 2b of FIG. 2a of the present invention.

As shown in FIGS. 2a and 2b, an optical film 20 is hooked on by a plurality of the positioning hooks 10a and is positioned on a back plate 30.

The first hook portion 11a of the positioning hook 10a is penetrated through and hooked on an edge of the optical film 20, in order to prevent the optical film 20 from being damaged by the penetrating of the positioning hook 10a, a through hole 21 can be disposed on the optical film 20 for the first hook portion 11a to go through.

The second hook portion 12a of the positioning hook 10a is hooked on a rim or an edge of the back plate 30, and the positioning hook 10a is fixed on the back plate 30 by hooking. The optical film 20 is disposed and fixed on the back plate 30 by the positioning hook 10a.

Figure 3:
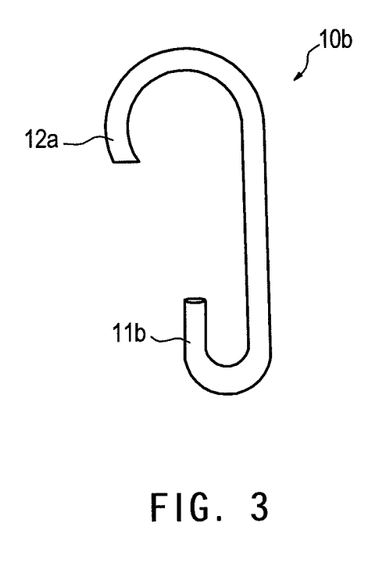
FIG. 3 is an illustration of a second structure of the positioning hook of the optical film of the backlight module of the present invention.

FIG. 3 is an illustration of a second structure of the positioning hook of the optical film of the backlight module of the present invention. A difference between this embodiment and the previous embodiments lie in that, a first hook portion 11b of a positioning hook 10b is an arc shaped hook.

Figure 4:
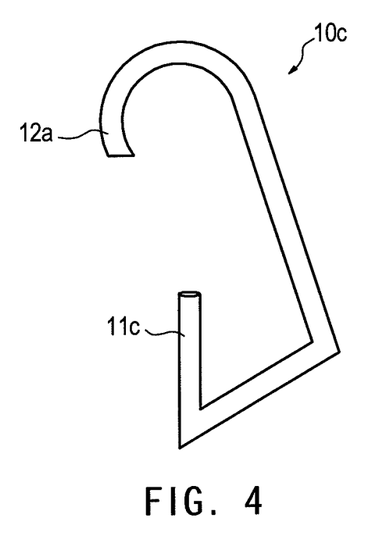
FIG. 4 is an illustration of a third structure of the positioning hook of the optical film of the backlight module of the present invention.

FIG. 4 is an illustration of a third structure of the positioning hook of the optical film of the backlight module of the present invention. A difference between this embodiment and the previous embodiments lie in that, a first hook portion 11c of a positioning hook 10c is a triangular hook.

Figure 5:
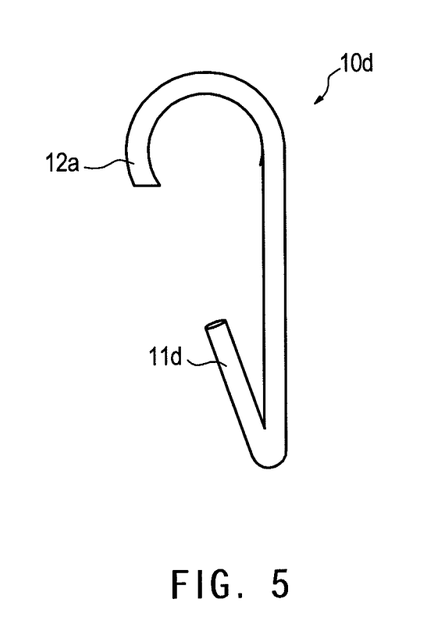
FIG. 5 is an illustration of a fourth structure of the positioning hook of the optical film of the backlight module of the present invention.

FIG. 5 is an illustration of a fourth structure of the positioning hook of the optical film of the backlight module of the present invention. A difference between this embodiment and the previous embodiments lie in that, a first hook portion 11d of a positioning hook 10d is a V-shaped hook.

Figure 6:
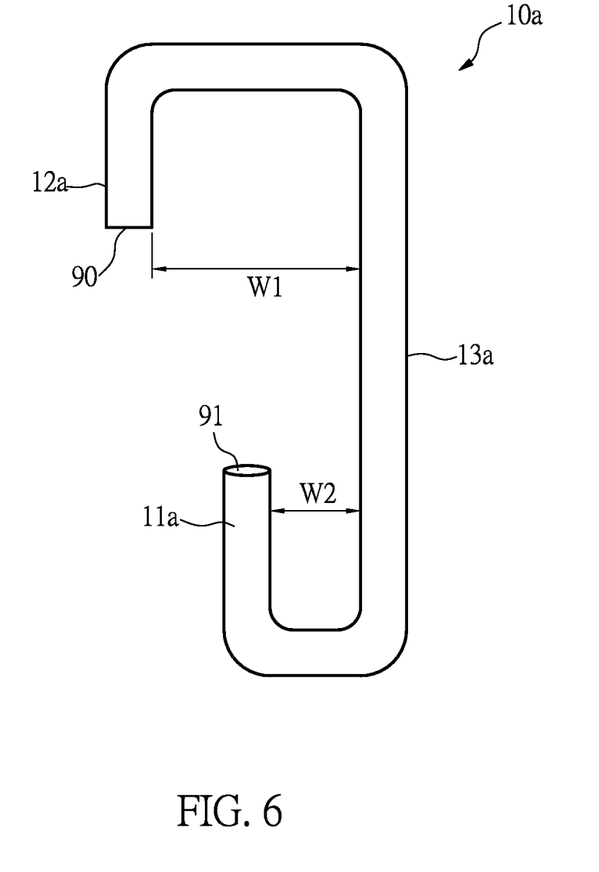
FIG. 6 is an illustration of a fifth structure of the positioning hook of the optical film of the backlight module of the present invention.

FIG. 6 is an illustration of a fifth structure of the positioning hook of the optical film of the backlight module of the present invention. A difference between this embodiment and the previous embodiments lie in that, a second hook portion 12a and a first hook portion (11a) of a positioning hook 10a are rectangular hook. Further, the positioning hook 10a has a vertical portion (13a), wherein a width (W2) between the tip end (91) of the first hook portion (11a) and the vertical portion (13a) is smaller than a width (W1) between a tip end (90) of the second hook portion (12a) and the vertical portion.

However, there is no limitation to the design, disposition and matching combination of the first hooking portions 11a, 11b, 11c and 11d and the second hooking portions 12a and 12b of the aforementioned positioning hooks 10a, 10b, 10c, 10d and 10e, the positioning hooks, the first hooking portions and the second hooking portions of different types and shapes can be designed according to requirements by designers in order to have the optical film hooked on by the positioning hook and disposed and fixed on the back plate.

Wherein the positioning hooks 10a, 10b, 10c, 10d and 10e of each of the embodiments can be integrally formed by the designers based on requirements.

Wherein the positioning hooks 10a, 10b, 10c, 10d and 10e of each of the embodiments are made of iron, aluminum, ferroalloy or aluminum alloy. Or, the positioning hooks 10a, 10b, 10c, 10d and 10e of each of the embodiments are made of plastic.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A backlight module having positioning hooks, comprising:
   a back plate; and
   an optical film having at least one through hole is disposed on the back plate by at least one positioning hook, wherein the positioning hook comprising:
   a vertical portion;
   a first hook portion extending from a top of the vertical portion, and disposed at a first end of the positioning hook, and the first hook portion being used for penetrating through and hooking on an edge of the optical film; and
   a second hook portion extending from a bottom of the vertical portion, and disposed at a second end of the positioning hook opposite to the first end, and the second hook portion being used for hooking on a rim of the back plate, so that the optical film is disposed and fixed on the back plate,
   wherein the through hole in the optical film is at a position corresponding to that of the first hook portion,
   wherein the first hook portion is a rectangular hook or an arc shaped,
   wherein the second hook portion is a rectangular hook or an arc shaped,
   wherein a width between a tip end of the first hook portion and the vertical portion is smaller than a width between a tip end of the second hook portion and the vertical portion.

* * * * *